United States Patent [19]

Duley et al.

[11] Patent Number: 4,710,943
[45] Date of Patent: Dec. 1, 1987

[54] STARLAN CODED DATA TRANSCEIVER COLLISION DETECTION CIRCUIT

[75] Inventors: Raymond S. Duley, Buda; Leslie Forth, Manchaca, both of Tex.

[73] Assignee: Advanced Micro Devices, Inc., Sunnyvale, Calif.

[21] Appl. No.: 941,238

[22] Filed: Dec. 12, 1986

[51] Int. Cl.$^4$ .............................................. H04B 1/40
[52] U.S. Cl. ........................................ 375/7; 371/57; 375/36; 455/58
[58] Field of Search .................. 375/7, 36; 340/825.5; 455/58, 78, 79; 371/57, 59, 63; 307/350, 356; 178/63 R, 63 B; 370/32, 94

[56] References Cited

U.S. PATENT DOCUMENTS

| | | | |
|---|---|---|---|
| 4,476,467 | 10/1984 | Terwilliger et al. | 340/825.5 |
| 4,519,074 | 5/1985 | Basile | 455/58 |
| 4,649,548 | 3/1987 | Crane | 375/7 |

Primary Examiner—Benedict V. Safourek
Attorney, Agent, or Firm—Patrick T. King; Davis Chin; J. Vincent Tortolano

[57] ABSTRACT

A daisy chain collision detection circuit for use with a StarLAN coded data transceiver includes a voltage comparator having an inverting input, a non-inverting input and an output. The inverting input of the voltage comparator is responsive to differential output voltages from a differential line drive and transient spike voltages from the primary of an isolation transformer. A charging capacitor is connected to the non-inverting input of the voltage comparator. The capacitor is charged to a reference voltage which is directly proportional to the peak voltage of the differential output voltages. The output of the voltage comparator provides an internal collision detection signal which is switched from a high logic level to a low logic level upon the occurrence of a daisy chain collision.

20 Claims, 2 Drawing Figures

STARLAN CODED DATA TRANSCEIVER COLLISION DETECTION CIRCUIT

BACKGROUND OF THE INVENTION

This invention relates generally to communication networks and more particularly, it relates to a daisy chain collision detection circuit for use with a StarLAN (proposed IEEE 802.3: 1BASE5 Specification) coded data transceiver.

As defined herein, a daisy chain connection, otherwise known as a passive serial bus or multipoint extension (MPE), is used as a means of interconnecting a plurality of data terminal equipments (DTE). The daisy chain connection refers to the joining together of receivers from the plurality of DTE's onto a first pair of wires and the joining together of transmitters from the plurality of DTE's onto a second pair of wires either by immediate connection or by drop cable. The respective receiver and transmitter wire pairs are either connected to a StarLAN hub or, if there is no StarLAN hub, joined to each other at one point only.

There is shown in FIG. 1 a StarLAN (an acronym for Star Local Area Network) daisy chain arrangement in which a plurality of transceivers DTE #1, DTE #2, ... DTE #n are star-connected (i.e., a star topology network) to a shared hub 10 via two twisted pairs of transmission lines 12 and 14. Each of the transceivers DTE #1, ... DTE #n consists of respective transmitters TxD1, ... TxDn and respective receivers RxD1, ... RxDn. As can be seen, the twisted pair of transmission lines 12 defining a transmit channel is connected to each of the transmitters DTE #1, ... DTE #n via isolation transformers 16. The twisted pair of transmission lines 14 defining a receive channel is connected to each of the receivers RxD1, ... RxDn via isolation transformers 18. In operation, when only one of the transmitters is transmitting the hub 10 repeats the transmitted signals and sends them to all of the other transceivers. However, when two or more transmitters are transmitting concurrently referred to as a "collision" it is needed to detect a StarLAN daisy chain collision condition at each active transmitter.

In order to determine the occurrence of such a collission, there has been provided heretofore a collision detector circuit connected between each of the transmitters and the isolation transformers 16 at the place marked by an "X". This prior art collision detection circuit was formed of a peak detector circuit utilizing a fixedd D.C. reference voltage of approximately +5.0 volts ±5%. Since the output voltage of the transmitter is susceptible to variations due to changes in the load, the peak detector circuit could be falsely triggered at times to indicate a collision when there was none thereby limiting the reliability and accuracy thereof. Also, sensitivity to collisions was limited due to the need to maintain adequate margins between the reference voltage and the peak voltage under all operating conditions of the transmitters. Thus, there is a need for improvements in such daisy chain collision detection circuits to provide a more accurate referenced voltage which is proportional to the peak output voltage of the transmitter.

SUMMARY OF THE INVENTION

Accordingly, it is a general object of the present invention to provide an improved daisy chain collision detection circuit which is relatively simple and economical to manufacture and assemble, but yet overcomes the disadvantages of the prior art detector circuits.

It is an object of the present invention to provide a daisy chain collision detection circuit for use with a StarLAN coded data transceiver having a more accurate referenced voltage which is proportional to the peak output voltage of the transmitter.

It is another object of the present invention to provide a daisy chain collision circuit for use with a StarLAN coded data transceiver which has improved reliability, accuracy and sensitivity.

It is another object of the present invention to provide a daisy chain collision detection circuit for use with a StarLAN coded data transceiver which may be formed as a part of a single monolithic integrated circuit.

It is still another object of the present invention to provide a daisy chain collision detection circuit which is formed of a voltage comparator and a capacitor connected to the non-inverting input of the voltage comparator, the capacitor being charged to a voltage which is directly proportional to the peak voltage of differential output voltages from a differential line driver.

It is yet still another object of the present invention to provide a daisy chain collision detection circuit which includes disabling means for reducing the load imposed to a line driver by a network of inactive transmitters.

It is yet another object of the present invention to provide a daisy chain collision detection circuit which includes temperature compensation means for balancing the voltages at the inverting and non-inverting inputs of a voltage comparator.

It is yet another object of the present invention to provide a daisy chain collision detection circuit which includes a collision output latch for insuring the capture and retention of signals of a short duration from the output of a voltage comparator.

It is yet another object of the present invention to provide a daisy chain collision detection circuit which includes time delay means responsive to an enable signal for preventing false triggering of a voltage comparator so as to maintain an external collision presence signal from a collision output latch to be in the high logic level.

In accordance with these aims and objectives, the present invention is concerned with the provision of a daisy chain collision detection circuit for use with a StarLAN coded data transceiver which includes a voltage comparator, first and second input nodes, first and second rectifiers, a first voltage divider, a second voltage divider, and a first charging capacitor. The voltage comparator has an inverting input, a non-inverting input, and an output. The first and second input nodes receive differential output voltages from a differential line driver and transient spike voltages from the primary of an isolation transformer. The first rectifier is connected between the first input node and a first intermediate node. The second rectifier is connected between the second input node and the first intermediate node. The first voltage divider is formed of a series connection of a first resistor and a second resistor. The first voltage divider is coupled between the input nodes and a second intermediate node. The junction of the first resistor and the second resistor is connected to the inverting input of the voltage comparator. The second voltage divider is formed of a series connection of a third resistor and a fourth resistor. The second voltage divider is connected between the first intermediate node and the second intermediate node. The junction of the third resistor and the fourth resistor is connected to the non-inverting input of the voltage comparator. The first charging capacitor is connected between the non-inverting input of the voltage comparator and the second intermediate node. The first charging capacitor is charged to a voltage which is directly proportional to the peak voltage of the differential output voltage.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENT

It is to be distinctly understood at the outset that the present invention shown in association with a StarLAN coded data transceiver is not intended to serve as a limitation upon the scope or teachings thereof, but is merely for the purpose of convenience of illustration of one example of its application. The present invention has numerous applications in other fields and apparatuses since the invention pertains to a detection circuit which provides a more accurate referenced voltage.

Figure 1:
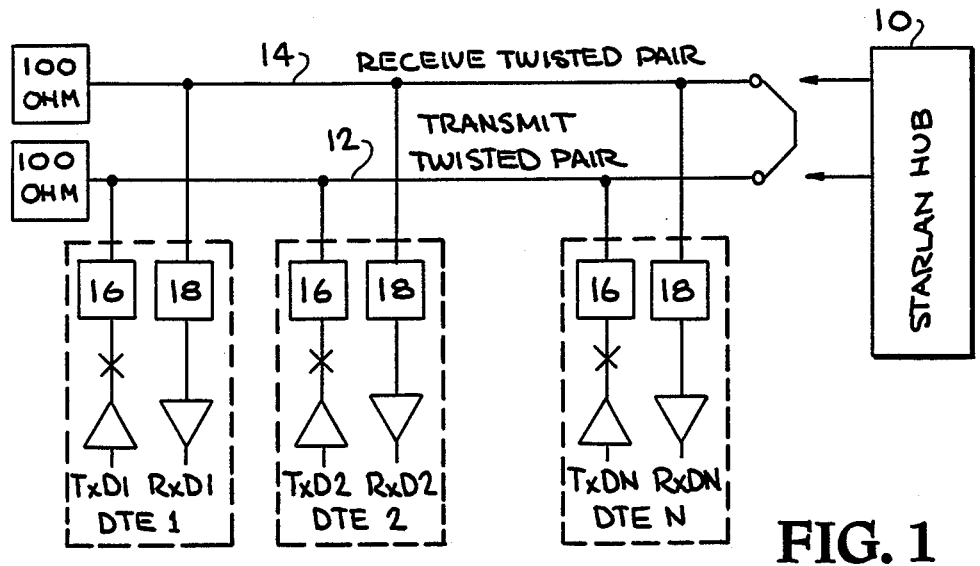
FIG. 1 is a block diagram illustrating a StarLAN daisy chain configuration in which the collision detection circuit of the present invention is used.
Figure 2:
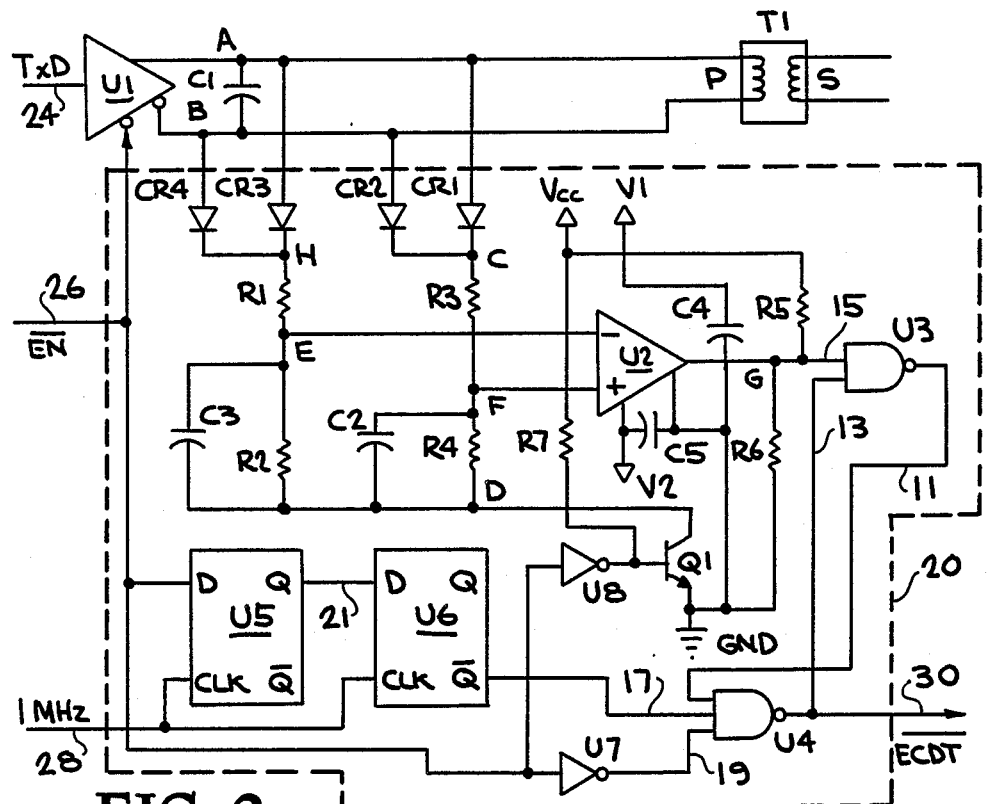
FIG. 2 is a detailed schematic circuit diagram of the collision detection circuit of the present invention.

Referring now to FIG. 2 of the drawings, there is illustrated a detailed schematic circuit diagram of a daisy chain collision detection circuit 20 for use with a StarLAN coded data transceiver. The detection circuit 20 of the present invention is connected between the output of a transmitter U1 in the transceiver and the primary winding P of an isolation transformer T1. The transmitter U1 and the isolation transformer T1 correspond to the transmitters TxD1, . . . TxDn and the respective transformers 16 shown in FIG. 1. The transmitter U1 consists of a differential line driver which is similar to one that is commercially available from Advanced Micro Devices, Inc. of Sunnyvale, Calif. and designated with their Part No. Am26LS30.

The line driver U1 receives a single-ended digitel data input signal TxD via line 24 and converts the same to differential output signals appearing at nodes A and B. A capacitor C1 is connected across the nodes A and B defining the differential outputs of the line driver U1. The capacitor C1 acts as a low-pass filter to eliminate high-frequency noise and as a slew rate limiter. Typically, the digital data input signal TxD is a Manchester encoded data transmission signal generated by a LAN (local area network) controller (not shown) of the type manufactured by Intel Corporation under the designation 82586. The StarLAN differential output signals are voltages having peak amplitude variations between +2.0 volts and +3.65 volts. The line driver U1 also receives an enable signal $\overline{EN}$ via line 26 for activating the same. In other words, when the signal $\overline{EN}$ is at a high or "1" logic level the line driver U1 is disabled and is set to the tri-state mode. When the signal $\overline{EN}$ is switched to a low or "0" logic level, the line driver U1 becomes activated.

The collision detection circuit 20 includes a high-speed voltage comparator U2 which is similar to one that is commercially available from National Semiconductor Corporation of Santa Clara, Calif. under their part No. LM319. The ends of the filter capacitor C1 connected across the nodes A and B also form inputs of the collision detection circuit. The end of the capacitor C1 connected to the input node A is also connected to the anode of a diode CR1, and the other end of the capacitor C1 connected to the input node B is also connected to the anode of a diode CR2. The cathode of the diode CR1 is tied to the cathode of the diode CR2 at an intermediate node C. The input node A is coupled to one end of a first voltage divider formed of series-connected resistors R1 and R2. The other end of resistor R2 is connected to an intermediate node D. The junction of the resistors R1 and R2 defines a node E which is connected to the inverting input of the voltage comparator U2. The intermediate node C is connected to one end of a second voltage divider formed of series-connected resistors R3 and R4. The other end of the resistor R4 is connected to the intermediate node D. The junction of the resistors R3 and R4 defines a node F which is connected to the non-inverting input of the voltage comparator U2.

A first charging capacitor G2 has its one end connected to the node F and the non-inverting input of the voltage comparator U2. The other end of the capacitor C2 is connected to the intermediate node D, A second charging capacitor C3 is connected in parallel with the resistor R2 which is interconnected between the node E and the intermediate node D. The capacitor C3 serves as a single pole filter with a small time constant which integrates any fast rising slew voltage spikes that may be present at the input nodes A and B. The first charging capacitor C2 also serves as a single pole filter with a larger time constant than the network formed by the first voltage divider (R1, R2) and the second charging capacitor C3. The capacitor C3 causes a small time delay of any voltage spikes appearing at the node E relative to the node F so as to prevent false triggering of the voltage comparator U2 when the line driver U1 is transmitting a message.

The voltage comparator U2 is connected to a dual polarity power source having a positive voltage V1 and a negative voltage V2. A filter capacitor C4 is connected between the positive voltage V1 and a ground potential for eliminating any high frequency noise. Similarly, a filter capacitor C5 is connected between the negative voltage V2 and the ground potential for eliminating any high frequency noise. It should be understood that a comparator requiring only a single polarity power source could be used instead of the voltage comparator U2 which utilizes the dual polarity power source. The voltage comparator U2 has an open collector output which requires an external resistor load. A third voltage divider formed of series-connected resistors R5 and R6 is provided to serve as the external load. The junction of the resistors R5 and R6 defines a node G which is connected to the output of the voltage comparator U2. The other end of the resistor R5 is connected to a supply voltage or potential VCC which is typically at +5.0 volts. The other end of the resistor R6 is connected to the ground potential.

In order to provide temperature compensation due to the presence of the first and second diodes CR1 and CR2, there are provided third and fourth diodes CR3 and CR4, which are coupling means, so that the two voltages appearing at the nodes E and F will move with similar temperature coefficients. In other words, the third and fourth diodes serve to balance the potential drop and non-linearity with temperature across the first and second diodes. As can be seen, the anode of the diode CR3 is connected to the input node A and the anode of the diode CR4 is connected to the input node B. The cathode of the diode CR3 is tied to the cathode of the diode CR4 at an intermediate node H. The node H is connected to the resistor R1 of the first voltage divider.

A collision output latch is formed of a first two-input NAND gate U3 and a second three-input NAND gate U4. The output of the first NAND gate U3 is connected to the input of the second NAND gate U4 via line 11, and the output of the second NAND gate U4 is connected to the input of the first NAND gate U3 via line 13. The other input of the first NAND gate U3 defines a set input on line 15 which is connected to the output of the voltage comparator U2 at the node G. The other inputs of the second NAND gate U4 define a first reset input on line 17 and a second reset input on line 19. The output of the latch is at the output of the second NAND gate U4 which is connected to line 30 to provide an external collision presence signal $\overline{ECDT}$. The collision output latch functions to insure the capture and retention of narrow spikes (signals having a short duration) from the output of the comparator U3.

A time delay circuit includes a first D-type flip-flop U5 and a second D-type flip-flop U6 which are connected together as a shift register. The first flip-flop U5 has its data input connected to the enable signal $\overline{EN}$ via the line 26 and its clock input connected to a 1 MHz clock signal via line 28. The Q output of the first flip-flop U5 is connected to the data input of the second flip-flop U6 via line 21. The second flip-flop U6 has its clock input also connected to the 1 MHz clock signal at the line 28 and its $\overline{Q}$ output connected to the first reset input of the collision output latch via the line 17. The time delay circuit creates a delay immediately after the line driver U1 is enabled (when the enable signal is switched from the high logic level to the low logic level) which prevents false triggering of the voltage comparator U2 during the time when the capacitors C2 and C3 are being fully charged.

A disabling means is provided for reducing the load imposed on the network through the primary winding of the isolation transformer when the line driver U1 is inactive by the first and second voltage dividers which is reflected into the secondary of the isolation transformer. The total load imposed by the network of inactive transmitters connected to the twisted pair of transmission lines 12 is thereby reduced. The disabling means is formed of an NPN-type transistor Q1, a current-limiting resistor R7 and an inverter U8. One end of the resistor R7 is connected to the supply potential VCC, and the other end of the resistor R7 is connected to the base of the transistor Q1. The base of the transistor Q1 is also connected to the output of the inverter U8. The input of the inverter U8 is connected to receive the enable signal $\overline{EN}$ on the line 26. The transistor Q1 has its collector connected to the intermediate node D and its emitter connected to a ground potential.

The node A is further connected to one end of the primary side P of the isolation transformer T1, and the input node B is further connected to the other end of the primary side P of the isolation transformer T1. The secondary side S of the isolation transformer T1 is connected to the twisted pair of the transmission lines 12 (FIG. 1).

An inverter U7 has its input connected to receive also the enable signal $\overline{EN}$ on the line 2G and its output connected to the second reset input of the collision output latch via the line 19. When the line driver U1 is enabled during transmission, the transistor Q1 of the disabling means is rendered conductive so as to be in the low resistance state, thereby linking the intermediate node D to the ground potential. As a result, the voltages $V_E$ and $V_F$ at the corresponding nodes E and F connected to the respective inverting and non-inverting inputs of the voltage comparator U2 will be produced as determined by the resistance values in the corresponding first and second voltage dividers. When the line driver U1 is disabled or not transmitting, the transistor Q1 is rendered non-conductive so as to be in the high resistance state which causes the output of the comparator to be in an indeterminate state. Therefore, in order to prevent false triggering of the voltage comparator U2 immediately after the line driver U1 is disabled (when the enable signal is switched from the low logic level to the high logic level), the output of the inverter U7 will be switched to the low logic state at the end of transmission. As a consequence, the output of the latch on the line 30 will be reset to a high logic level, thereby indicating that no collision has occurred.

In operation, the differential output signals from the differential line driver U1 are received at the input nodes A and B when the enable signal $\overline{EN}$ on the line 26 is at the low or "0" logic level. On the other hand, when the enable signal $\overline{EN}$ is in the high or "1" logic level, the line driver is disabled. Assuming that the line driver U1 has been activated, the single-ended digital data input signal TxD on the line 24 will cause the differential output signals to appear at the nodes A and B of the collision detection circuit 20. Since the transistor Q1 will be rendered conductive, the first charging capacitor C2 and the second charging capacitor C3 will be charged up to the node voltages $V_F$ and $V_E$ at the respective nodes F and E. The voltage $V_F$ on the first charging capacitor C2 at the node F produces a reference voltage and is directly proportional to the peak voltage of the differential output voltages from the line driver U1 across the input nodes A and B. While the absolute DC voltages at the nodes E and F will change as a function of the differential output voltages from the line driver and the loading imposed by other transmitters, the differential voltage between the nodes E and F will be substantially constant.

The difference between the voltages $V_F$ and $V_E$ represents the operating margin when only the line driver U1 is active and there are no collisions occurring (no other transmitter in the DTE's is transmitting). In this condition, the node voltage $V_F$ at the non-inverting input will be at a higher potential than the node voltage $V_E$ at the inverting input of the voltage comparator U2. Consequently, the comparator U2 compares these two voltages and causes its output at the node G on the line 15 to be driven to its higher voltage state which has an upper voltage level defined by the load resistors R5 and R6 of the third voltage divider. This higher voltage from the comparator will maintain the output of the NAND gate U3 of the latch at a low logic level. Thus, the output of the NAND gate U4 or the external collision presence signal $\overline{ECDT}$ on the line 30 will be at a high logic level indicating that no daisy chain collision has taken place.

On the other hand, if another transmitter in the DTE's is also driving the transmission lines 12, transient voltage spikes will be received from the primary winding of the isolation transformer T1. As a result, the node voltage $V_E$ will become transiently more positive than the node voltage $V_F$ so as to generate narrow negative pulses at the output of the comparator at the node G. The output of the voltage comparator provides an internal collision detection signal which is switched from a high logic level to a low logic level upon the occurrence of a diasy chain collision. This low logic level will cause the output of the NAND gate U3 to change to the high logic level. Thus, the output of the NAND gate U4 or the external collision presence signal will be switched from the high logic level to the low logic level indicating that a collision has occurred. This low logic level will be maintained until the end of transmission when the enable signal $\overline{EN}$ is switched back to the high logic level.

At the end of transmission, the output of the inverter U7 will be switched immediately to the low logic level so as to reset the output of the NAND gate U4 to the high logic level. The $\overline{Q}$ output of the flip-flop U6 in the time delay circuit will also be at the low logic level after a short time delay which also resets the output of the NAND gate U4. When the next transmission occurs, the $\overline{Q}$ output of the flip-flop U6 will be maintained in the low logic level immediately after the line driver U1 is enabled so as to allow the capacitors C2 and C3 to reach their full charge. Accordingly, any false collision indications by the voltage comparator will not be latched and the external collision presence signal $\overline{ECDT}$ will remain at the high logic level during this time. After the time delay expires, the output of the voltage comparator will be allowed to change to the low logic level and thus switch the external collision presence signal to the low logic upon the occurrence of an actual collision.

For completeness in the disclosure of the above described collision detection circuit but not for purposes of limitation the following representative values and component identifications are submitted. These values and components were employed in a system that was constructed and tested and which provides high quality performance. Those skilled in the art will recognize that many alternative elements and values may be employed in constructing circuits in accordance with the present invention.

| Part | Type or Value |
| --- | --- |
| U2 | LM319 |
| U3 | 74LS00 |
| U4 | 74LS10 |
| U5, U6 | 74LS74 |
| U7 | 74LS04 |
| U8 | 74LS05 |
| CR1, CR2, CR3, & CR4 | 1N914 |
| Q1 (NPN) | 2N3904 |
| C2 | 220 pF |
| C3 | 47 pF |
| C4 | 0.1 uF |
| C5 | 0.1 uF |
| R1 | 390 Ohms |
| R2 | 2.7K Ohms |
| R3 | 560 Ohms |
| R4 | 47K Ohms |
| R5 | 10K Ohms |
| R6 | 10K Ohms |
| R7 | 10K Ohms |

From the foregoing detailed description, it can thus be seen that the present invention provides an improved daisy chain collision detection circuit having a more accurate referenced voltage which is proportional to the peak output voltage of the transmitter. Further, there is provided a disabling means for reducing the load to the line driver imposed by the network of inactive transmitters daisy chained together.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A daisy chain collision detection circuit for use with a StarLAN coded data transceiver, comprising:

a voltage comparator having an inverting input, a non-inverting input and an output;

first and second input nodes for receiving differential output voltages from a differential line driver and transient spike voltages from the primary of an isolation transformer;

first rectifier means being connected between said first input node and a first intermediate node;

second rectifier means being connected between said second input node and said first intermediate node;

a first voltage divider formed of a series connection of a first resistor and a second resistor, said first voltage divider being coupled between said input nodes and a second intermediate node, the junction of said first resistor and said second resistor being connected to the inverting input of said voltage comparator;

a second voltage divider formed of a series connection of a third resistor and a fourth resistor, said second voltage divider being connected between said first intermediate node and said second intermediate node, the junction of said third resistor and said fourth resistor being connected to the non-inverting input of said voltage comparator; and a first charging capacitor being connected between the non-inverting input of said voltage comparator and said second intermediate node, said first charging capacitor being charged to a voltage which is directly proportional to the peak voltage of said differential output voltages.

2. A collision detection circuit as claimed in claim 1, wherein said first rectifying means comprises a first diode having its anode connected to the first input node and its cathode connected to said first intermediate node.

3. A collision detection circuit as claimed in claim 2, wherein said second rectifying means comprises a second diode having its anode connected to the second input node and its cathode connected to said first intermediate node.

4. A collision detection circuit as claimed in claim 1, wherein the output of said voltage comparator provides an internal collision detection signal which is switched from a high logic level to a low logic level upon the occurrence of a daisy chain collision.

5. A collision detection circuit as claimed in claim 1, further comprising means for integrating voltage spikes appearing at the inverting input of said voltage comparator so as to prevent false triggering thereof when the line driver is active.

6. A collision detection circuit as claimed in claim 5, wherein said integrating means comprises a second charging capacitor connected between the inverting input of said voltage comparator and said second intermediate node.

7. A collision detection circuit as claimed in claim 1, further comprising disabling means for reducing the load imposed through the primary winding of the isolation transformer when the line driver is inactive by said first and second voltage dividers which is reflected into the secondary of the isolation transformer.

8. A collision detection circuit as claimed in claim 7, wherein said disabling means includes a transistor, a current-limiting resistor and an inverter, said inverter having its input connected to an input node for receiving an enable signal and its output connected to the base of said transistor, said transistor having its collector connected to said second intermediate node and its emitter connected to a ground potential, said current-limiting resistor having its one end connected to a supply potential and its other end connected to the base of said transistor.

9. A collision detection circuit as claimed in claim 8, further comprising a third voltage divider formed of a series connection of a fifth resistor and a sixth resistor, said third voltage divider being connected between the supply potential and the ground potential, the junction of said fifth resistor and said sixth resistor being connected to the output of said voltage comparator.

10. A collision detection circuit as claimed in claim 4, further comprising collision output latch means responsive to the internal collision detection signal for generating an external collision presence signal which is switched from a high logic to a low logic level upon the occurrence of a daisy chain collision.

11. A collision detection circuit as claimed in claim 10, further comprising time delay means responsive to an enable signal for preventing false triggering of said voltage comparator so as to maintain the external collision presence signal from said latch means to be in the high logic level.

12. A collision detection circuit as claimed in claim 3, further comprising temperature compensating means for balancing the potential drop and non-linearity with temperature across said first and second diodes.

13. A collision detection circuit as claimed in claim 12, wherein said temperature compensating means comprises a third diode having its anode connected to said first input node and its cathode connected to said first resistor, and a fourth diode having its anode connected to said second input node and its cathode connected to said first resistor.

14. A daisy chain collision detection circuit for use with a StarLAN coded data transceiver, comprising:
a voltage comparator having an inverting input, a non-inverting input and an output;
first and second input nodes for receiving differential output voltages from a differential line driver and transient spike voltages from the primary of an isolation transformer;
first rectifier means being connected between said first input node and a first intermediate node;
second rectifier means being connected between said second input node and said first intermediate node;
a first voltage divider formed of a series connection of a first resistor and a second resistor, said first voltage divider being coupled between said input nodes and a second intermediate node, the junction of said first resistor and said second resistor being connected to the inverting input of said voltage comparator;
a second voltage divider formed of a series connection of a third resistor and a fourth resistor, said second voltage divider being connected between said first intermediate node and said second intermediate node, the junction of said third resistor and said fourth resistor being connected to the non-inverting input of said voltage comparator;
a first charging capacitor being connected between the non-inverting input of said voltage comparator and said second intermediate node, said first charging capacitor being charged to a voltage which is directly proportional to the peak voltage of said differential output voltages;
collision output latch means responsive to the output of said voltage comparator for generating an external collision presence signal which is switched from a high logic level to a low logic level upon the occurrence of a daisy chain collision; and
time delay means responsive to an enable signal for preventing false triggering of said voltage comparator so as to maintain the external collision presence signal from said latch means to be in the high logic level.

15. A collision detection circuit as claimed in claim 14, further comprising means for integrating voltage spikes appearing at the inverting input of said voltage comparator so as to prevent false triggering thereof when the line driver is active.

16. A collision detection circuit as claimed in claim 15, wherein said integrating means comprises a second charging capacitor connected between the inverting input of said voltage comparator and said second intermediate node.

17. A collision detection circuit as claimed in claim 14, further comprising disabling means for reducing the load imposed through the primary winding of the isolation transformer when the line driver is inactive by said first and second voltage dividers which is reflected into the secondary of the isolation transformer.

18. A collision detection circuit as claimed in claim 17, wherein said disabling means includes a transistor, a current-limiting resistor and an inverter, said inverter having its input connected to an input node for receiving an enable signal and its output connected to the base of said transistors, said transistor having its collector connected to said second intermediate node and its emitter connected to a ground potential, said current-limiting resistor having its one end connected to a supply potential and its other end connected to the base of said transistor.

19. A collision detection circuit as claimed in claim 18, further comprising a third voltage divider formed a series connection of a fifth resistor and a sixth resistor, said third voltage divider being connected between the supply potential and the ground potential, the junction of said fifth resistor and said sixth resistor being connected to the output of said voltage comparator.

20. A collision detection circuit as claimed in claim 14, further comprising temperature compensating means for balancing the potential drop and non-linearity with temperature across said first and second rectifier means.

* * * * *